Sept. 30, 1924.                                                    1,510,245
S. V. REEVES
COOKING, HEATING, AND COMBINATION HOT WATER STOVE
Filed Nov. 22, 1922          8 Sheets-Sheet 1

INVENTOR:
Samuel V. Reeves
BY
ATTORNEYS.

Sept. 30, 1924. 1,510,245
S. V. REEVES
COOKING, HEATING, AND COMBINATION HOT WATER STOVE
Filed Nov. 22, 1922 8 Sheets-Sheet 4

Sept. 30, 1924.
S. V. REEVES
1,510,245
COOKING, HEATING, AND COMBINATION HOT WATER STOVE
Filed Nov. 22, 1922
8 Sheets-Sheet 7

INVENTOR:
Samuel V. Reeves.
BY
ATTORNEYS

Patented Sept. 30, 1924.

1,510,245

UNITED STATES PATENT OFFICE.

SAMUEL V. REEVES, OF HADDONFIELD, NEW JERSEY.

COOKING, HEATING, AND COMBINATION HOT-WATER STOVE.

Application filed November 22, 1922. Serial No. 602,495.

*To all whom it may concern:*

Be it known that I, SAMUEL V. REEVES, a citizen of the United States, residing at Haddonfield, county of Camden, State of New Jersey, have invented a new and useful Cooking, Heating, and Combination Hot-Water Stove, of which the following is a specification.

My invention relates to a novel combination cooking, heating and hot water stove, and among the objects of the invention are to provide a novel construction and arrangement of parts permitting the use of a single or a plurality of firepots with a single or plurality of fires which may be run jointly or independently to vary the heating capacity, and whereby the stove may be employed throughout the entire year and arranged for use and to give the heating capacity required at different seasons of the year, and to provide heat for heating a building or dwelling, by radiation or through a radiating or hot water heating system, and also to heat water for bath and kitchen purposes.

Another object of the invention is to so construct the parts as to render them readily interchangeable to give the heating capacity desired for either heating a radiating system or water for bath and kitchen purposes, or both, according to the season of the year or prevalent weather, while also making provision for cutting out or rendering either inoperative, so that the radiating system or heating of a building may be rendered inoperative and the hot water heater or generator employed to the exclusion of the heating system or vice versa, and the amount of fire correspondingly reduced, thus economizing in the use of fuel.

Another object of the invention is to provide a novel construction and arrangement of parts whereby means is provided for not only dividing the ash pit into separate chambers but to divide the fire pot or box, so that instead of a single fire, a double fire may be used, or either employed separately or independently of the other for the heating or hot water supply systems, and either fire ignited or started from the other or shut off therefrom at will, a novel form of fire pot being provided with co-operative means of supporting the water jackets and fire-pot separating means and means whereby either or both of the water jackets may be replaced by similar jackets or solid cast iron heating and cooking fire pots, or rendered inoperative for water heating purposes, permitting the use of a single water jacket or use for both the radiating system and hot water supply, or either; to provide for increasing the heating efficiency of the stove generally or for any specific purpose, the device being susceptible of a variety of combinations and arrangements for various purposes and capacities and employing a single base and a single exit smoke or stove pipe to a chimney, suitable dampers being provided for control of the fires singly or jointly, and the fires being capable of single or joint use and for changing from operation as one fire to a united fire and vice versa.

The invention further comprehends the use by replacement or otherwise, of solid cast iron heating and cooking fire pots, with or without a water circulating back or block, or water circulating heating rings, or the water jackets above referred to, in different relations or relative positions to the fire pot or pots, and thus the fire or fires, to vary the heating capacity or efficiency according to the particular requirements and as best suited to the use and capacity required.

Other novel features of construction and advantage will hereinafter more fully appear in the detailed description.

For the purpose of illustration my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figures 34 and 35 represent detached perspective views of gates or plates for controlling the independent and joint or simultaneous use of the fires.

Similar numerals of reference indicate corresponding parts in the figures.

Figure 1:
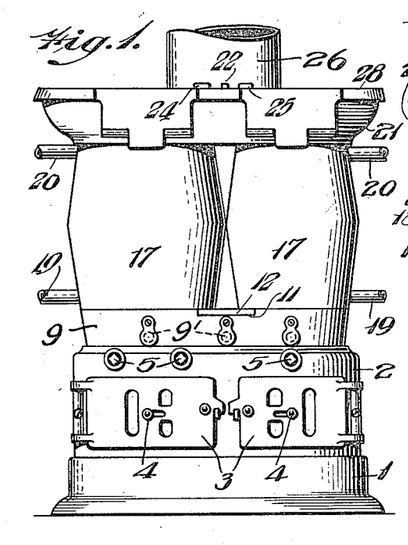
Figure 1 represents in front elevation, a combination stove, embodying my invention.
Figure 2:
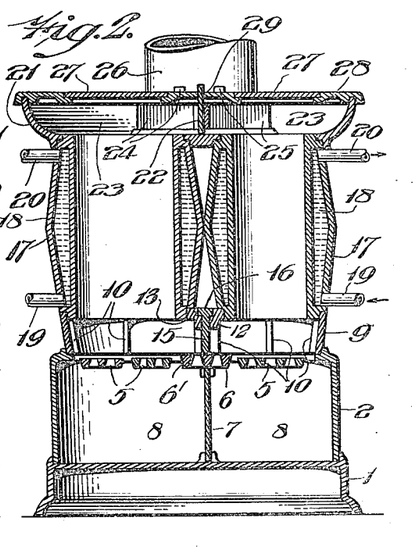
Figure 2 represents a central vertical section of the stove shown in Figure 1.
Figure 3:
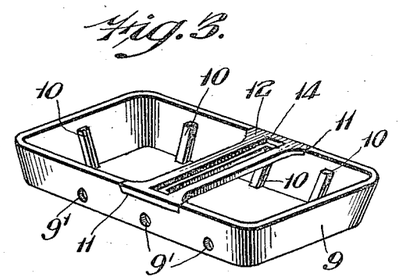
Figure 3 represents a detached perspective view of a fire pot or ash ring employed in the construction.
Figure 3A:
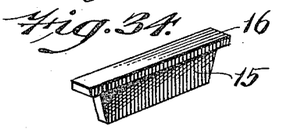
Figure 4:
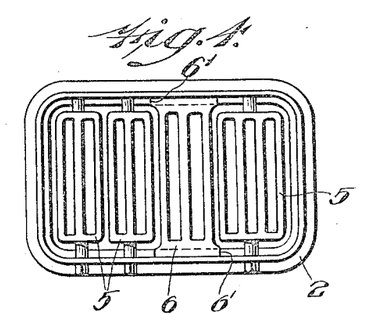
Figure 4 represents a plan view of a base also forming a part of the stove, with the grate in position.

Referring to the drawings, and particularly to Figures 1 to 4 inclusive, and 34, 1 designates a base or foundation on which a base top or ash pit ring 2, having doors 3 with slide dampers 4 therein, is seated. The parts 1 and 2 combined form the base. The base top 2 carries sets of dumpable grates 5 at its upper portion, and a removable stationary central grate section 6 seated in opposite recesses 6' in the upper edge of the base top 2, as seen in Figures 2 and 4. A vertical plate 7 may be inserted in base top 2 to form separate ash chambers or pits 8, so that the draft for primary combustion to each stove unit may be independently controlled if desired by means of its respective dampers 4. The top of ash pit ring or base top 2 is recessed or provided with a seat at the top to receive a narrow or shallow ash or fire pot ring 9, preferably of oblong contour and having spaced vertical internal ribs 10 including opposed pairs of central ribs, with their upper ends spaced from the top of the ring 9 and adapted to form supports for an auxiliary fire pot or lining of metal or refractory material not shown, which forms a support for the water jackets 17, or heating and cooking fire pot, the parts being reversible and interchangeable. Covered holes 9' are also provided at the front to insert a poker. The top edges of fire pot ring 9 at the opposed front and rear sides or walls, are provided with recesses or seats 11 and a top bridge-piece or cross support 12 has its ends mounted in said recesses so as to lie flush with the top of the fire pot and the water jackets 17 have recesses 13 to receive the bridge-piece which has a central longitudinal slot 14. A gate or plate 15 as seen in Figure 34, is adapted to be inserted in the slot 14 and between the pairs of central ribs 10 to divide the fire pot transversely into two fire pots or boxes, and said plate tapers downwardly and has a top supporting enlargement or head 16 projecting upon opposite sides to seat in slot 14 of cross-support 12. Water jackets 17 seat upon the upper ends of the ribs 10 and the top edge of fire pot ring 9 and bridge-piece 12, and are cored out to provide water chambers 18 with which communicate cold water inlet pipes 19 and hot water outlet pipes 20. The jackets 17 may be of the same size or of different sizes, and are non-communicating, and separated above bridge-piece 12 to permit convenient insertion or removal of the slide plate or gate 15, or raising and lowering thereof.

A top casing ring or section 21 seats upon the tops of the water jackets 17 and has a partition and damper 22 forming chambers 23, and dampers 24 and 25 are provided to control the draft on the fires in either or both fire pots, through an exit opening to a smoke pipe or flue 26, as set forth in my copending application, Serial Number 556,722, filed April 26, 1922, so that each fire pot, if desired, may be operated as an independent stove unit or as a combined stove as may be desired in accordance with conditions and requirements met with in practice, such as the cubic surface area to be heated, capacity or efficiency required, weather conditions, etc. The top of the stove is provided with the removable lids 27 so that the top of the stove can be used for cooking, heating irons, or other domestic purposes. A top 28 is provided on top casing ring 21, being seated on the top edge thereof and having a slot 29 through which an extension of the damper 22 extends to form a projecting portion which can be manually actuated. Suitable slots are also provided in the top 28 for valves 24 and 25, all as shown and described in my copending application above referred to. The water jackets and chambers thereof are produced in accordance with my prior Patent #1,156,929, dated October 15, 1915, on my prior Patent #1,190,460, dated July 11, 1916, which affords one hundred per cent fire contact, it being seen that the water chamber has its greatest diameter at the point at which the greatest heat is generated.

Figure 35:
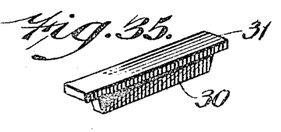

Plate 15 when in position, as seen in Figure 2, separates the fire pot into two chambers or boxes for individual or separate, single and independent use of the fires and control thereof, but may be raised to permit either to be ignited or started from the other, or to permit their joint use and control as a single unit instead of a double unit. Furthermore, if desired, the plate 15 may be replaced or substituted by a shallower or narrower plate 30 having a top enlargement or head 31 projecting upon opposite sides, as seen in Figure 35, which plate when inserted in the slot 14 will close the slot or opening between the jackets 17 and prevent the escape of smoke, and gaseous products of combustion, while leaving an opening or passage between the chambers or boxes of the fire pot open and in communication where their joint use is desired. When the plate 15 is in position in the slot 14, said plate rests on the center bar of the central grate section 6, as seen in Figure 2, and in conjunction with the plate 7, forms a continuous vertical division wall through the ash pit and the fire pot produced by the ring 9 and jackets 17.

Figures 5, 6:
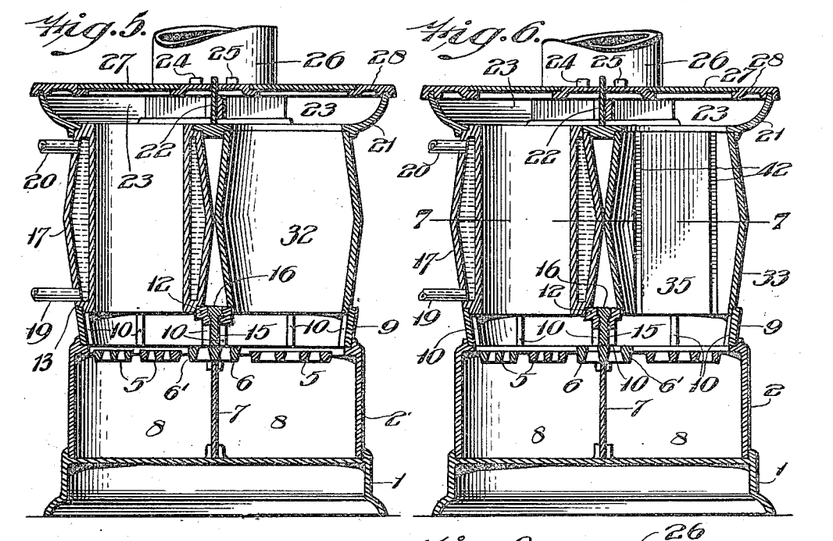
Figure 5 represents in vertical sectional elevation, another embodiment of the invention.
Figure 6 represents in vertical sectional elevation, still another embodiment of the invention.

Referring now to Figure 5, the construction is the same as that hereinbefore described, except that one of the water jackets 17 is replaced or substituted by a solid cast iron heating and cooking fire pot or heating shell 32, which is recessed like the water jackets 17 and fits within the fire pot ring 9, and also seats upon the upper edge of said ring. The upper end of the pot or shell 32 fits in the bottom seat of top casing ring or section 21. This permits reduction of the water heating capacity and gives means for increased local heating purposes or capacity, as well as distant heating means and facility for cooking or other domestic uses.

Figure 7:
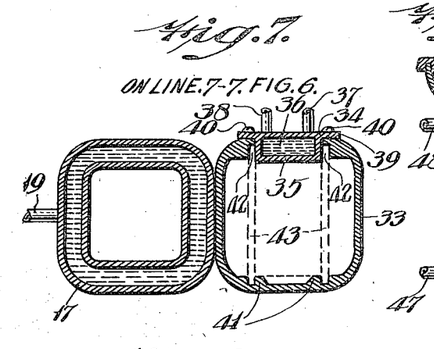
Figure 7 represents a horizontal section taken on the section line 7—7 of Figure 6.

In the embodiment seen in Figures 6 and 7, one of the water jackets 17 is replaced by a solid cast iron heating shell or heating and cooking fire pot 33, which is provided with an opening 34 at the back to receive a water back 35 having a water chamber 36 to which the cold water is introduced through an inlet pipe 37 and from which the hot water is withdrawn through an outlet pipe 38. The water back 35 is preferably provided with a flange 39 for securing it in position in overlapping relation to the wall of the pot around the opening or recess, as by screws or other fasteners 40, with an interposed gasket or packing if desired. The water chamber 36 is used for heating water for bath and kitchen purposes. The front wall of the fire pot 33 is provided with recesses or spaced lugs 41 at the inside, and the back wall around the opening 34 is thickened to provide seats or recesses 42 at the inside, so that if necessary or desirable, especially to increase the water heating capacity, insulating plates 43 may be slid into position in the recesses from the top, and the front may be lined with fire clay or brick, as may the inside of the fire pot ring 9 between the ribs 10, thus insulating the pot 33 from the fire and imparting heat only to the water back 35 to give greater heating capacity or efficiency to the water therein for bath and kitchen purposes.

Figure 8:
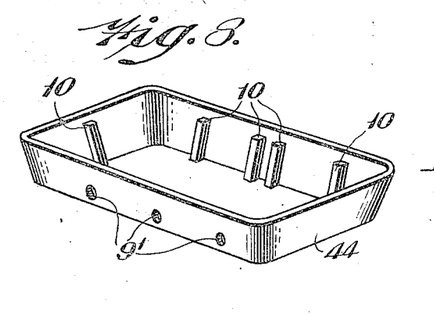
Figure 8 represents a detached perspective view of another form of fire pot, or ash ring.
Figure 9:
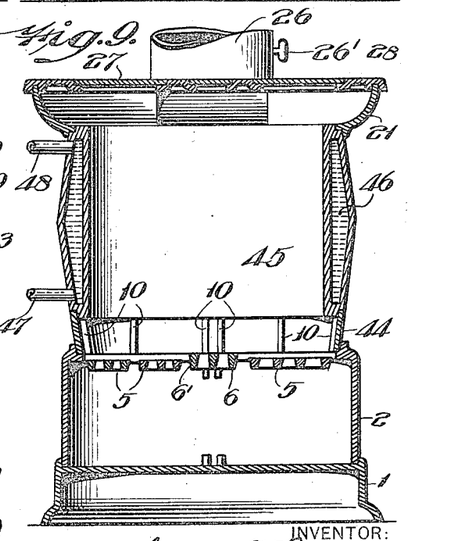
Figure 9 represents in vertical sectional elevation, another embodiment of my invention.

In the embodiment shown in Figures 8 and 9, the fire pot ring 9 is replaced by an ash or fire pot ring 44 in which the recesses or seats 11, seen in Figures 3 and 4 are omitted, as well as the bridge-piece 12 and plate 15. In this form, instead of employing a plurality of fire pots, I employ a single oblong water jacket 45 having a water chamber 46, a cold water inlet pipe 47 and a hot water outlet pipe 48, the water jacket 45 fitting the contour of the fire pot ring 44 and the division plate 7 being omitted, to permit the use of a single fire and a single ash pit, but either the valves 24 and 25, or a damper 26′ provided in the smoke pipe 26, or both, are used.

Figure 10:
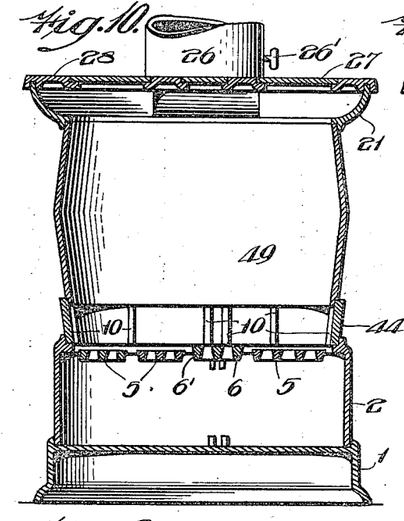
Figure 10 represents a sectional elevation similar to Figure 9, of another embodiment of my invention, in which a single water jacket is replaced by a solid cast iron heating pot.

As shown in Figure 10, a single oblong solid cast iron heating and cooking fire pot 49 is employed, the other parts being of the same construction as that shown in Figures 8 and 9, and described in connection therewith.

Figure 11:
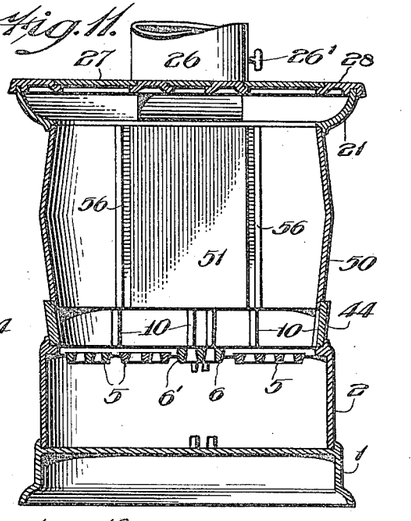
Figures 11, 12, 13, 14, and 15 represent in sectional elevation similar to Figure 9, further embodiments of my invention.

In Figure 11 the construction is the same as in Figure 10, except that a single cast iron heating and cooking fire pot 50 is employed having an opening at the back as shown and described in connection with the heating shell or fire pot 33, seen in Figures 6 and 7, for the insertion or application of a water back 51. The front and back walls of the shell or pot may also be equipped for the insertion of baffle or insulating plates, as in Figure 7, to insulate the pot from the fire, so that all of the heat is directed to the heating of the water in the chamber of the water back, and to keep a cool room in hot weather.

Figure 12:
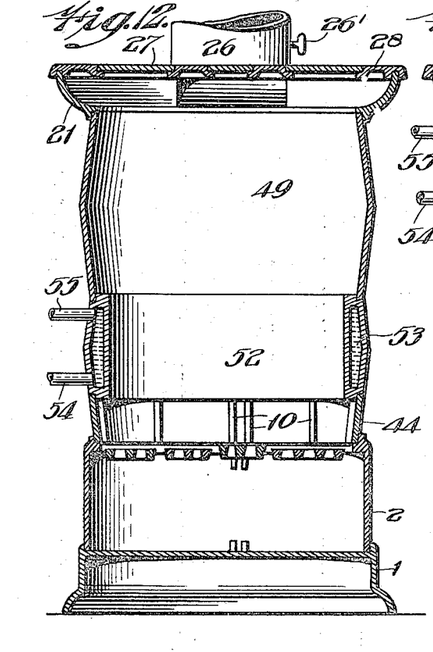

In Figure 12, the construction is the same as shown in Figure 10, except that a water ring 52 is inserted or interposed between the shell or pot and the fire pot ring, and is provided with a water chamber 53 to which cold water is conducted through an inlet 54 and from which hot water is withdrawn through a pipe 55. In the arrangement or combination shown in this embodiment, a stove for both cooking and heating, and for water heating purposes is provided, the water ring being in close proximity to the fire.

Figure 13:
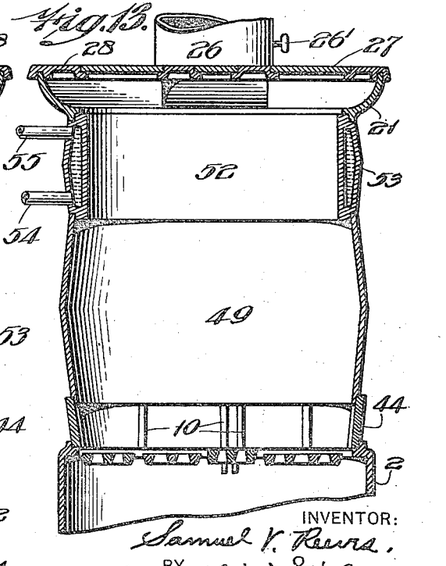

In Figure 13, the same parts are employed as in Figure 12, except, that the shell or pot 49 is mounted directly upon fire pot ring 44, instead of interposing the water ring therebetween as shown in Figure 12. However, in this embodiment, the water ring 52 is seated upon the top of the shell or pot 44, and interposed between it and the top casing ring or section 21, thus placing the water ring further away from the fire for varying water heating capacity or efficiency, or a wood draft fire.

Figure 14:
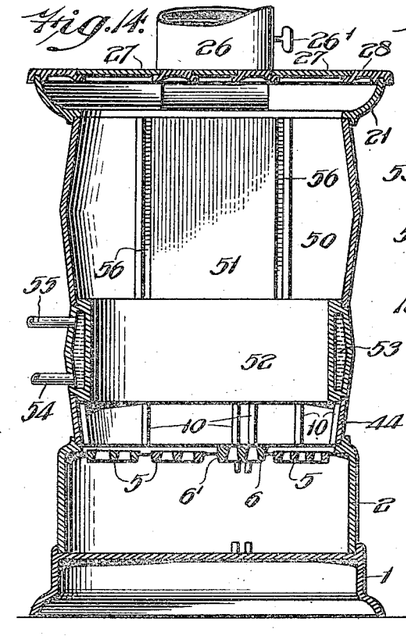

In Figure 14, the water ring 52 is employed in the same position or relation as shown in Figure 12 but instead of fire pot 49, is provided with a pot 50 as shown in Figure 11, above it, having a water back 51, to give hot water for heating purposes for a radiating system or domestic purposes as in the embodiments shown in Figures 12 and 13. This arrangement gives radiator or water heating capacity, and the ring used for radiating purposes while the water back is used for heating water for bath and kitchen use or coupled with the water ring 52 for heating.

Figure 15:
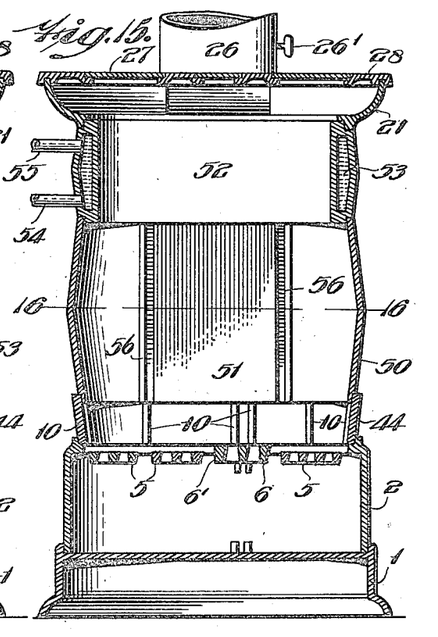
Figure 16:
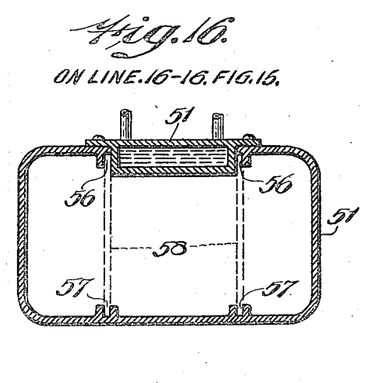
Figure 16 represents a horizontal section taken on the section line 16—16 of Figure 15.

In Figures 15 and 16 the same parts are employed as in Figure 14, but instead of placing the water ring 52 in close proximity to the fire as in Figure 14, the arrangement is reversed, so that the heating shell or pot 50 is seated directly on the fire pot ring 44 in close proximity to the fire, and the water ring is placed at the top in a remote position with respect to the fire, to give greater water heating capacity for domestic uses and less efficiency for radiating purposes, than in the arrangement shown in Figure 14. In this form as in Figures 11 and 14, the front and back walls of the shell or pot 50, are provided with seats, lugs or recesses 56 and 57 for receiving insulating plates 58 to insulate the shell or pot from the fire and to give greater water heating capacity or efficiency.

Figure 17:
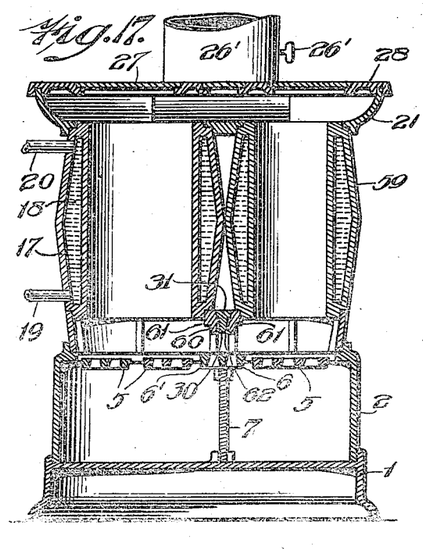
Figures 17, 18, 19 and 20 represent in sectional elevation, still further embodiments of my invention.

In Figure 17, the construction and arrangement is the same as shown and described in connection with Figures 1 to 4 inclusive, except that a water jacket 59 without pipe connections, or with connections at the back, is employed in lieu of one water jacket 17 and a bridge-piece 60 having lateral extensions 61 extending beneath the water jackets, while the plate 30 is inserted in a slot 62 in the bridge-piece 60 to close it without dividing the fire pot, thus permitting both fires to be operated simultaneously or jointly as a single or united fire instead of as a plurality of independent fires. The ash pit division plate 7 is also omitted.

Figure 18:
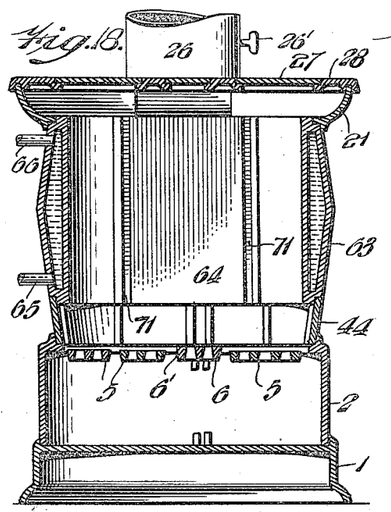

In Figure 18 the inserted water ring 52 is omitted and in lieu of pots 49 or 50, or two independent water jackets, or one jacket and a small pot, a water jacket 63 like the water jacket 45 seen in Figure 9, is employed, except that it has an inserted water back 64, and is provided with a cold water inlet 65 and a hot water outlet 66.

Figure 19:
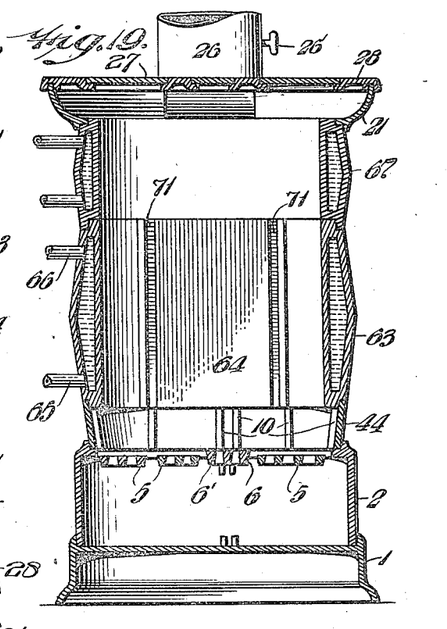

In Figure 19, the construction is the same as in Figure 18, except that a hot water ring 67, like water ring 52, is seated on the water jacket 63 and then the top casing ring or section 21 placed thereon, so that the water ring is interposed between the two.

Figure 20:
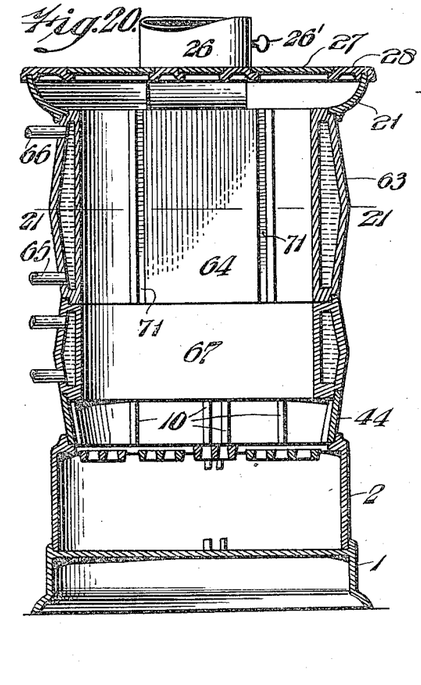
Figure 21:
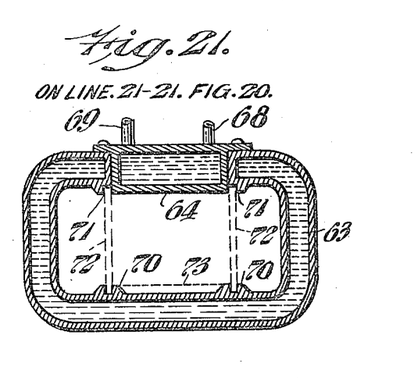
Figure 21 represents a horizontal section taken on the line 21—21 of Figure 20.

In Figures 20 and 21, the water ring 67 is shown interposed between the fire pot ring 44 and water jacket 63 which is of oblong cross-section and has the water back 64 provided with a cold water inlet 68 and a hot water outlet 69. Lugs 70 are provided inside at the front and recesses or seats 71 inside at the back to receive insulating plates 72 to insulate the water jacket from the fire when the radiating system is not in use.

Figure 22:
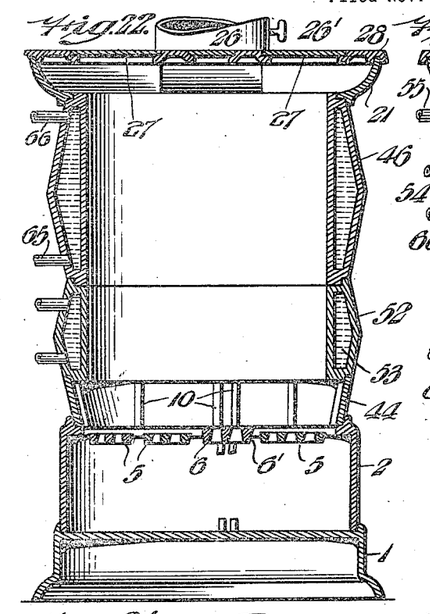
Figures 22, 23, 24 and 25 represent in sectional elevation, still further embodiments of my invention.

In Figure 22, a water jacket 46 is placed on a water ring 52, the latter being seated directly on the ash or fire pot ring 44 and interposed between the ring and the jacket.

Figure 23:
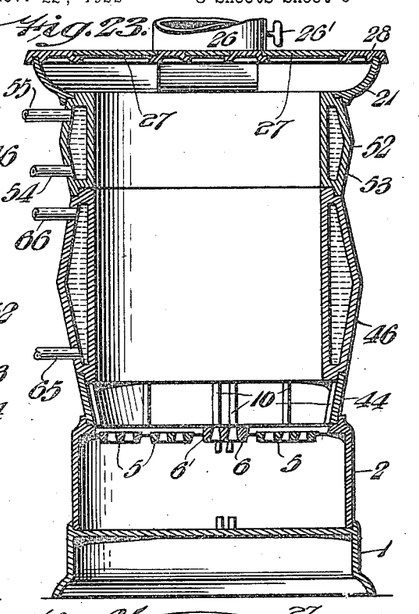

In Figure 23, the arrangement or combination shown in Figure 22 is reversed, the water jacket 46 being seated directly on the ash or fire pot ring 44 and the water ring 52 on the jacket and interposed between it and the top section 21. The arrangement or embodiment seen in Figure 22 is used where the hot water heating efficiency must be raised to a high standard and the weather is moderate or does not require extremely high efficiency in the radiating system, while with the arrangement seen in Figure 23, the water ring 52 is remote from the fire instead of the water jacket 46, or instead of being in close proximity thereto, thus placing the water jacket 46 in close proximity or next to the fire for use where greater efficiency is required in the radiating system instead of the hot water supply for domestic use. In both embodiments, the fire is operated as a united fire and the ash pit as a single unit.

Figure 24:
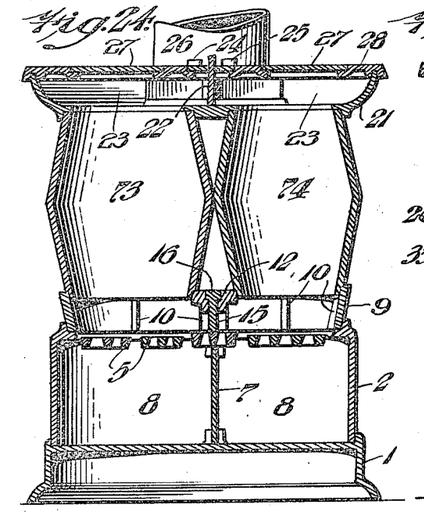

In Figure 24, ash or fire pot rings 9 or 44 may be employed as in the other instances and is divided, as is also the ash pit or base top ring 2, to permit their individual use. Also, instead of using two water jackets 17, or such a water jacket and a solid heating and cooking fire pot or shell such as 32 or 33, two solid shells or pots 73 and 74, corresponding to shell or pot 32, are employed with the ash or fire pot ring 9 and a plate or gate 15, which permits joint or independent use of the fires.

Figure 25:
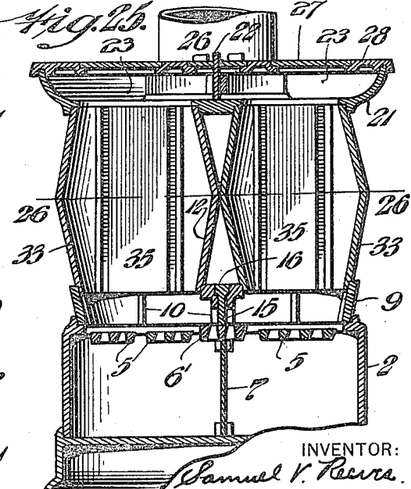
Figure 26:
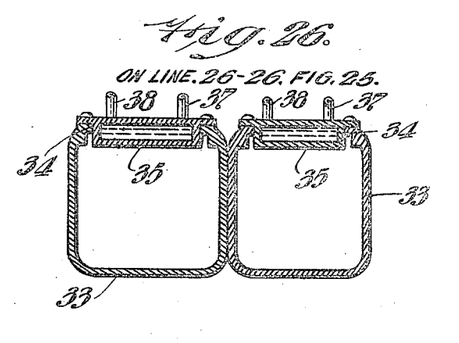
Figure 26 represents a sectional view taken on line 26—26 of Figure 25.

In Figures 25 and 26 two fire pots or shells 33 with water backs 35, are employed, in conjunction with the divided fire or ash pot ring and ash pit, and other parts in accord with those described in connection with and as seen in Figures 2, 5, 6 and 24 of the drawings.

Figure 27:
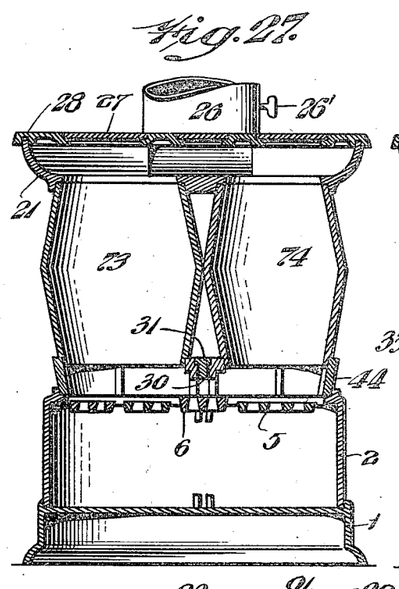
Figures 27, 28, 29, 30 and 31 also represent in sectional elevation still further embodiments of my combination stove.

In Figure 27 of the drawings, the construction is the same as described in connection with Figure 24, except that the slot 14 of the bridge-piece 12 has a plate 30 inserted therein to close the slot, while leaving the space therebeneath open to provide for joint use of the fires and ash chambers.

Figure 28:
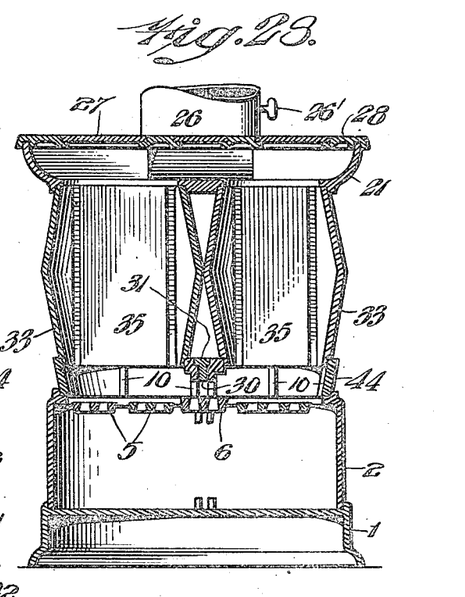

In Figure 28, the arrangement is the same as seen in Figure 27, except that two fire pots 33 corresponding to that shown in Figures 6 and 7, and 25, are employed, having water backs 35 to give larger water heating surfaces or capacity for domestic uses, in conjunction with the heating and cooking feature given by a solid fire pot and damper 26.

Figure 29:
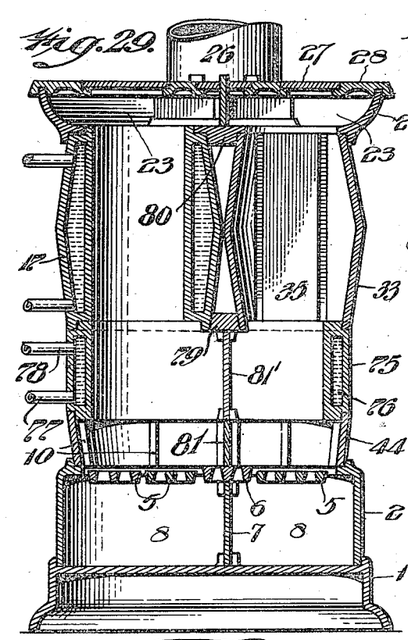

In Figure 29 dampers 24 and 25 are employed, and the other construction is identical with that seen in Figure 28, except that a water jacket 17 is employed in lieu of one fire pot 33 and a water ring 75 preferably having parallel walls, is interposed between the ash or fire pot ring 44, and parts 17 and 33. The ring 75 has a water chamber 76 supplied with water through an inlet pipe 77 and from which hot water is drawn through an outlet pipe 78. The parts of the stove interfit one within the other, as in all the other forms or embodiments of the invention heretofore described, and the top of the ring 75 is provided with a closure or bridge-piece 79 and the top with a closure 80 between the water jacket 17 and the fire pot 33. A plate 81 is also mounted in or between the spaced pairs of ribs 10 and forms a continuation of the center bar of grate section 6 and ash pit or base top division plate 7. By this arrangement, the fires and ash pit chambers are separate or independent and independently heat the jacket and the fire pot 33, but both fires heat the ring 75, and permit independent or coupled use of the ring 75 and the water back 35 for heating or hot water use. A plate 81' may divide the ring 75.

Figure 30:
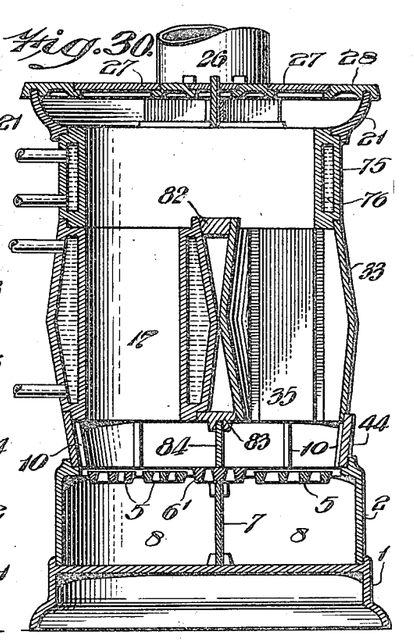

In Figure 30, the construction is the same as seen in Figure 29, except that the ring 75 is placed above instead of below the jacket 17 and fire pot 33, and bridge-piece 82 at the bottom of the ring 75, and top of jacket 17 and pot 33, and a bridge-piece 83 at the bottom of the latter and top of ring 44 to receive the plate 84 to divide or separate the fire pot or ash ring 44 and to close the space between the top and bottom ends of the jacket 17 and the pot 33, so that the smoke and gaseous products of combustion will not escape. This arrangement places the water jacket 17 in close proximity to the fire and the water ring remote therefrom, to give greater heat in the radiating system and heat for the hot water supply, or permit a radiator to be heated by the water ring 75 and water back 35, or either. The water ring 75 may, if desired, be used at the top and bottom of two heating and cooking fire pots or water jackets and fire pots, as it is thought will be readily understood.

Figure 31:
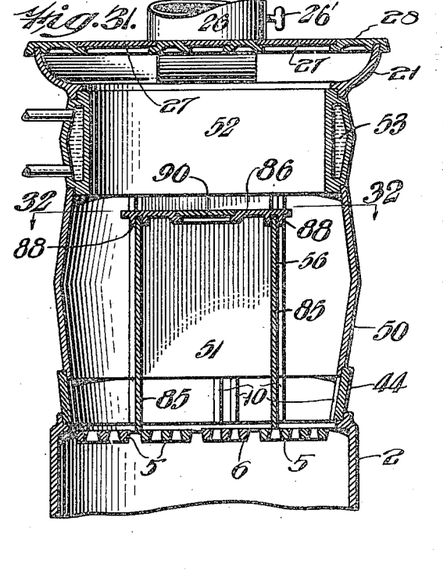
Figure 32:
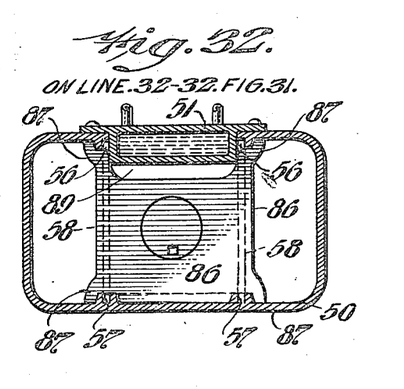
Figure 32 represents a sectional view taken on line 32—32 of Figure 31.

In Figures 31 and 32 of the drawings, the construction and arrangement is the same as shown in Figures 15 and 16, except that insulating plates 85 are inserted in seats 56 and 57, and their upper ends terminate in spaced relation to or a short distance from and below the top of the heating pot 50. A stove top or baffle plate 86 is horizontally supported on the upper ends of the plates 85 and has corner lugs 87 fitting around or spanning lugs or seats 56 and 57 and bottom lugs or recesses 88 receiving the upper ends of the plates. The stove top of baffle plate fits against the front of the fire pot 50 but is spaced from the water back 51 to provide a slot 89, so that while the escape of the smoke and hot gaseous products of combustion is baffled, sufficient escape is provided at the back to give proper draft and at the same time, a cooler room and greater heating efficiency for the water back and hot water supply is obtained. The baffle plate 86 has an opening to receive a stove lid or plate 90, for use when desired.

Figure 33:
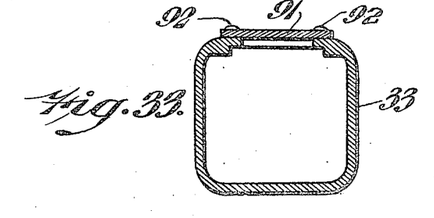
Figure 33 represents a section of a fire pot or heating drum corresponding to those shown in Figures 24, 25 and 27, in which the water back is replaced by a solid plate closure.

In Figure 33, a heating shallow fire pot 33 of solid cast iron construction, as seen in Figures 25 and 26, is shown, but in lieu of a water back 35, a solid back plate 91 is secured in position by screws or other fasteners 92, with an interposed gasket or packing if desired.

It will be seen that all of the various combinations are built upon the same base and that various of the parts are interchangeable, and require but a few moments time to interchange the parts.

There is but one chimney connection required; and the ash pit may be single or divided—depending upon the combination. There are three regulating dampers in the main top for controlling the fire in the operation of the various units of the several combinations.

The use of any unit of a combination, may be discontinued without disturbing or reducing the efficiency of the remaining combination.

In the combinations with united or merged fires, where the fires are brought together from the grates to the top of ash ring, there is an increased efficiency and added convenience in the easy maintenance of fire over very long periods of time. Too, when desired, the fire can be carried much lower than is possible in single or separate fires. These united or combined fires can be separated or divided when desired.

A full length water ring (multiple) can be operated above or below, or, both above and below sectional units. When below the sectional units, there is a direct fire contact over the whole surface of the multiple ring. This makes possible four (4) separate and distinct water circuits in some of the combinations.

Both the single and full length cooking and heating fire pots are made so that a water back can be added any time wanted, without having to purchase a new fire pot or in any manner dismounting the fire pot in use. In other words, the cooking and heating fire pots can be used with or without water backs.

It will be apparent from the foregoing that in accordance with my present invention the parts are all made standard so that the combined stove can be used throughout the entire year and substitutions or additions made which will adapt the stove for all the year service and for a large variety of purposes. The supply of hot water produced can be increased or diminished as may be desired and when a minimum supply of hot water is desired a minimum amount of fuel will be used.

By employing fire chambers which are oblong in contour a greater fire contact surface in proportion to the volume of fire is obtained than can be provided by any other form of a fire chamber.

It will now be apparent that I have devised a novel and useful combination cooking, heating and hot water stove which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. A combination stove including a base with an ash pit and a grate, a shallow fire pot ring on the base, fire pots on the ring, a top on the fire pots, means to divide the ash pit, and means to divide the fire pots.

2. A combination stove having a single base top and a plurality of grates including a stationary central section, a fire pot ring on the base top over the grates, a heating pot drum on the fire pot ring, and a top casing section having a ring engaging the pot and a stove top on the pot ring.

3. A combination hot water stove comprising a base, a base top thereon forming an ash pit and having doors and slide dampers, dumpable grate sections and a removable stationary central grate section, said base top having a central vertical partition beneath the central grate section, a fire pot ring on the base top adapted to support one or more heating pots with a superposed top having a smoke exit and a damper, and means in the fire pot above the central grate for dividing the fire pot for permitting use thereof as a single unit.

4. A combination stove including a base top forming an ash pit, a fire pot and ash ring having a plurality of shoulders spaced from its top edge and opposed front and back guides, a plate insertable in the guides having a top supporting enlargement, a plurality of cored fire pots seated on the ring, a top member having a chamber communicating with said fire pots and having a single discharge flue, and means for controlling said flue.

5. A combination stove including a base top forming an ash pit, a fire pot and ash ring having a plurality of shoulders spaced from its top edge and opposed front and back guides, a plate insertable in the guides having a top supporting enlargement, a plurality of cored fire pots seated on the ring, a top member having a chamber communicating with said fire pots and having a discharge flue, dampers for controlling the exit of the products of combustion from both fires through said flue, and means to divide said ash pit into separate chambers.

6. In a combination hot water stove including a base having an ash pit and grate sections, a fire pot ring mounted on the base having openings in the front thereof, a plurality of fire pots on the ring, closure means between the fire pots and a top on the fire pots.

7. A combination hot water stove including a base having an ash pit and grate sections, a fire pot ring mounted on the base having openings in the front thereof, a plurality of fire pots on the ring, closure means between the fire pots, one of said closure means comprising a slotted member, a gate in the slotted member at the fire pot ring, and a division wall insertable in the base to divide the ash pit.

8. A combination hot water, heating stove including a base, a fire pot and ash ring thereon, a plurality of fire pots on said ring, one of said fire pots having a water chamber, means to divide the ring to form a plurality of fire pots or to permit joint use and control thereof, and means to divide the base.

9. A combination hot water stove including a base having an ash pit and grate sections, a fire pot ring mounted on the base having openings in the front thereof, a plurality of fire pots on the ring, closure means between the fire pots, one of said closure means comprising a slotted member, a gate in the slotted member at the fire pot ring, a division wall insertable in the base to divide the ash pit, one of said fire pots having a water back, and insulation plates to insulate the wall of the fire pot except the water back from the fire.

SAMUEL V. REEVES.

Witnesses
WM. D. DOWNEY,
C. D. McVAY.